(12) United States Patent
Farhid

(10) Patent No.: US 9,989,418 B2
(45) Date of Patent: Jun. 5, 2018

(54) DISC CAVITY THERMOCOUPLE UPGRADE

(71) Applicant: Siemens Energy, Inc., Orlando, FL (US)

(72) Inventor: Seyed N. Farhid, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 311 days.

(21) Appl. No.: 14/881,589

(22) Filed: Oct. 13, 2015

(65) Prior Publication Data

US 2017/0101886 A1 Apr. 13, 2017

(51) Int. Cl.
| F01D 25/00 | (2006.01) |
| G01K 1/08 | (2006.01) |
| G01K 1/14 | (2006.01) |
| F01D 17/08 | (2006.01) |
| G01K 7/06 | (2006.01) |

(52) U.S. Cl.
CPC ............. *G01K 1/08* (2013.01); *F01D 17/085* (2013.01); *G01K 1/14* (2013.01); *G01K 7/06* (2013.01); *G01K 2205/00* (2013.01)

(58) Field of Classification Search
CPC . F01D 21/003; F01D 1/08; F01D 1/14; F01D 2013/024
See application file for complete search history.

(56) References Cited

U.S. PATENT DOCUMENTS

| 4,132,114 A * | 1/1979 | Shah .................... G01K 1/14 374/144 |
| 4,300,774 A * | 11/1981 | Hollis .................. F01D 21/003 277/630 |
| 5,185,996 A * | 2/1993 | Smith ................... F01D 17/02 374/144 |
| 7,153,023 B2 * | 12/2006 | Howard ................ G01K 1/14 277/606 |
| 9,442,022 B2 * | 9/2016 | Parsons ................ G01K 1/12 |

* cited by examiner

*Primary Examiner* — Ninh H Nguyen

(57) ABSTRACT

An arrangement to prevent thermocouple chafing with a guide tube within a rotor disc cavity during gas turbine operation is provided. The arrangement includes an interstage seal housing, a guide tube, and a thermocouple including a tip portion, an elongated portion, a head portion, and an antichafing strip. The guide tube is disposed in a radially extending bore of the interstage seal housing. The tip portion extends radially inward into the rotor disc cavity, the elongated portion is disposed at least partially within the guide tube, and the head portion is disposed radially outward of the casing. The tip portion includes a temperature sensing element which measures the temperature of the rotor disc cavity. The antichafing strip is disposed along the length of the elongated portion so that it is at least partially disposed within the guide tube. A method to prevent premature gas turbine shutdown due to thermocouople failure is also provided.

15 Claims, 4 Drawing Sheets

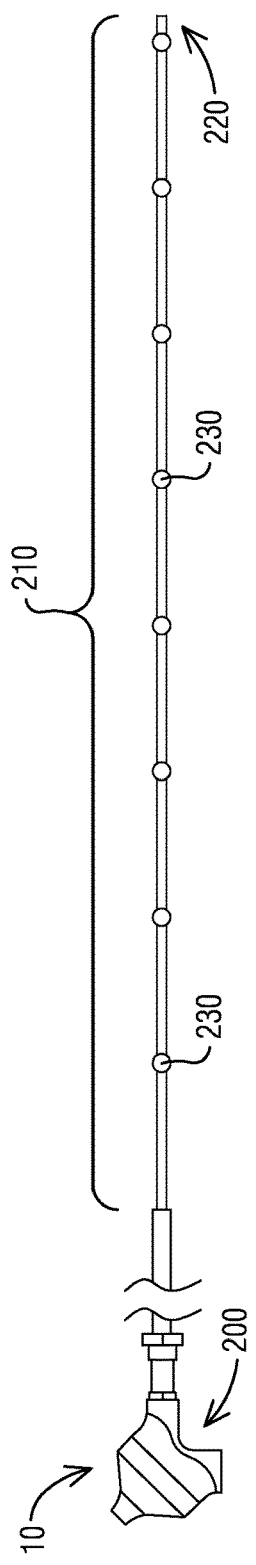
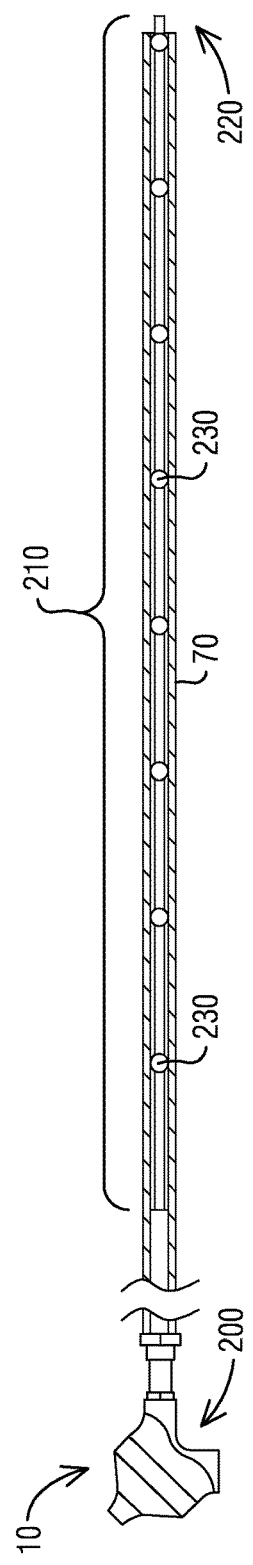

DISC CAVITY THERMOCOUPLE UPGRADE

BACKGROUND

1. Field

The present application relates to gas turbines, and more particularly to an arrangement to prevent thermocouple chafing with a guide tube within a rotor disc cavity, as well as a method to prevent premature gas turbine shutdown due to rotor disc cavity thermocouple failure.

2. Description of the Related Art

Thermocouples are used within the turbine section of a gas turbine engine to give an indication of the condition of the rotor disc cavity. The rotor disc of the turbine section is a critical component of the gas turbine which is exposed during engine operation to high centrifugal stresses and high temperatures. Thus, it is crucial to have a continuous indication of the rotor disc. A temperature sensing element of a thermocouple can give such an indication.

Routinely, thermocouples are inserted into the gas turbine through guide tubes positioned within radial extending bores in components of the turbine section of the gas turbine. Ideally, this series of guide tubes are connected with each other in a straight line configuration. The components through which the guide tubes are positioned may include the outer casing, the turbine blade ring, a turbine vane, and the interstage seal housing such that when fully inserted, the tip portion of the thermocouple which includes the temperature sensing element is positioned within the rotor disc cavity. The rotor disc cavity is situated between two adjacent rotor discs.

Two thermocouples are used per stage of turbine vanes so that a redundant system exists; i.e., if one thermocouple is damaged and is non-operational, a second thermocouple may be operational and relied upon for the temperature reading of the rotor disc cavity of that stage. Such a redundant system may prevent premature gas turbine shutdown. However, occasionally, both thermocouples fail resulting in a premature gas turbine shutdown.

SUMMARY

Briefly described, aspects of the present disclosure relates to an arrangement to prevent thermocouple chafing with a guide tube within a rotor disc cavity during gas turbine operation and a method to prevent premature gas turbine engine shutdown due to thermocouple failure within a rotor disc cavity.

A first aspect of provides an arrangement to prevent thermocouple chafing with a guide tube within a rotor disc cavity during gas turbine operation. The arrangement includes an interstage seal housing, a guide tube, and a thermocouple, the thermocouple including a tip portion, an elongated portion, a head portion, and an antichafing strip. The guide tube is disposed in a radially extending bore of the interstage seal housing. The tip portion extends radially inward into the rotor disc cavity, the elongated portion is disposed at least partially within the guide tube, and the head portion is disposed radially outward of a turbine outer casing. Additionally, the tip portion includes a temperature sensing element which measures the temperature of the rotor disc cavity. The antichafing strip is disposed in a position along the length of the elongated portion such that the antichafing strip is at least partially disposed within the guide tube.

A second aspect provides a method to prevent premature gas turbine shutdown due to thermocouple failure within a rotor disc cavity. The method includes providing a thermocouple including a tip portion, an elongated portion, and a head portion wherein the tip portion includes a temperature sensing element, disposing a plurality of antichafing strips along the length of the elongated portion, and threading the tip portion through a guide tube disposed within a radially extending bore in an interstage seal housing between two adjacent rotor discs until the tip portion with the temperature sensing element extends radially inward into a rotor disc cavity.

DETAILED DESCRIPTION

Frequently, the straight line configuration of guide tubes through which the thermocouple must pass, becomes unaligned due to factors such as vibrations of the engine or thermal expansion of the turbine components. Because of this unalignment, the thermocouple frequently comes into contact with the guide tubes causing the thermocouple to chafe. This chafing may cause premature failure of the thermocouple during engine operation. For example, when both thermocouples fail in a stage, the engine may prematurely go offline. Obviously, a gas turbine shutdown due to thermocouple failure is highly undesirable. One approach to avoid premature chafing of a thermocouple would be to position antichafing strips along the length of the inserted portion of the thermocouple, particularly the portion of the thermocouple that is threaded through the guide tubes. The antichafing strips take the wear or chafing against the inner surface of the guide tubes instead of the thermocouple itself.

Figure 1:
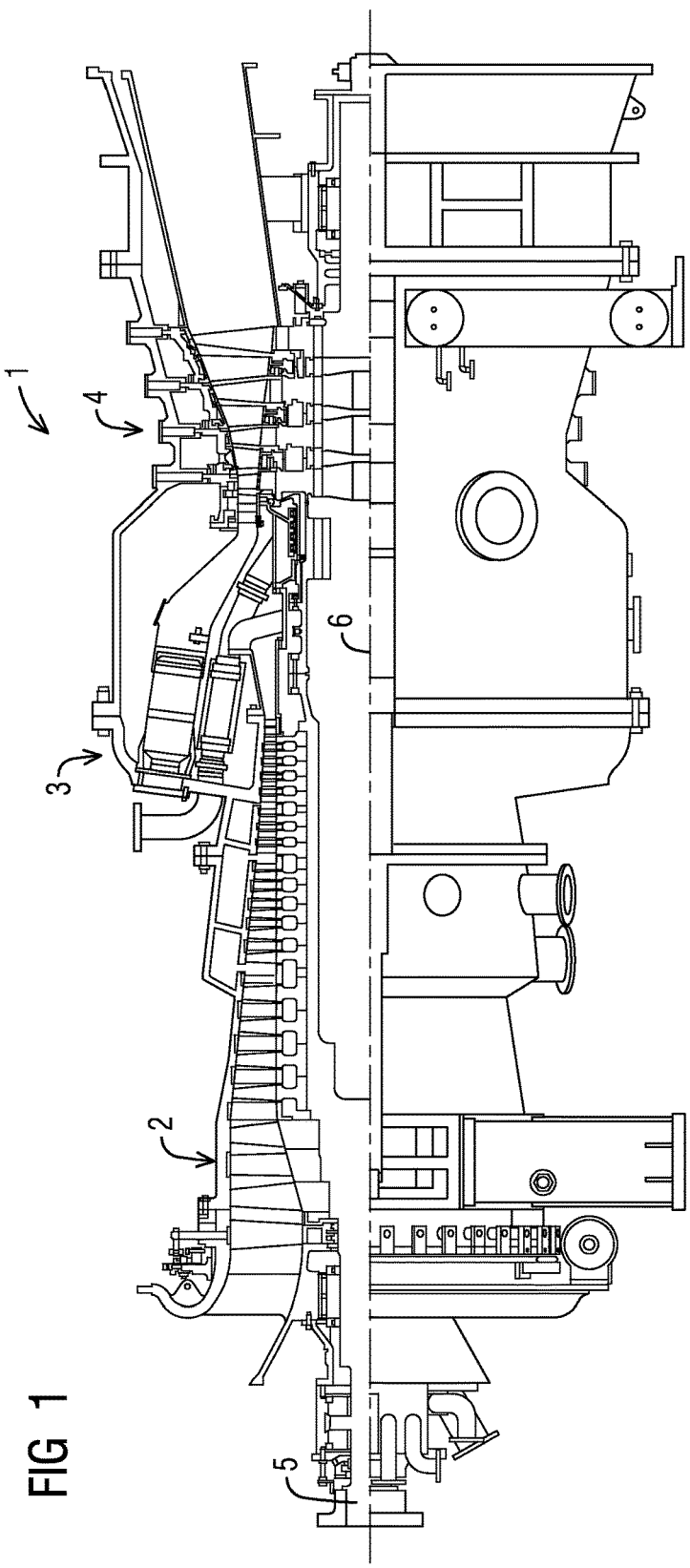
FIG. 1 . . . illustrates a longitudinal view of gas turbine engine.

FIG. 1 illustrates a gas turbine engine (1) including a compressor section (2), an intermediate section (3), and a turbine section (4). The turbine section (4) usually includes at least 4 stages of blades and vanes. A rotor (5) is arranged along the longitudinal centerline (6) of the gas turbine (1).

Figure 2:
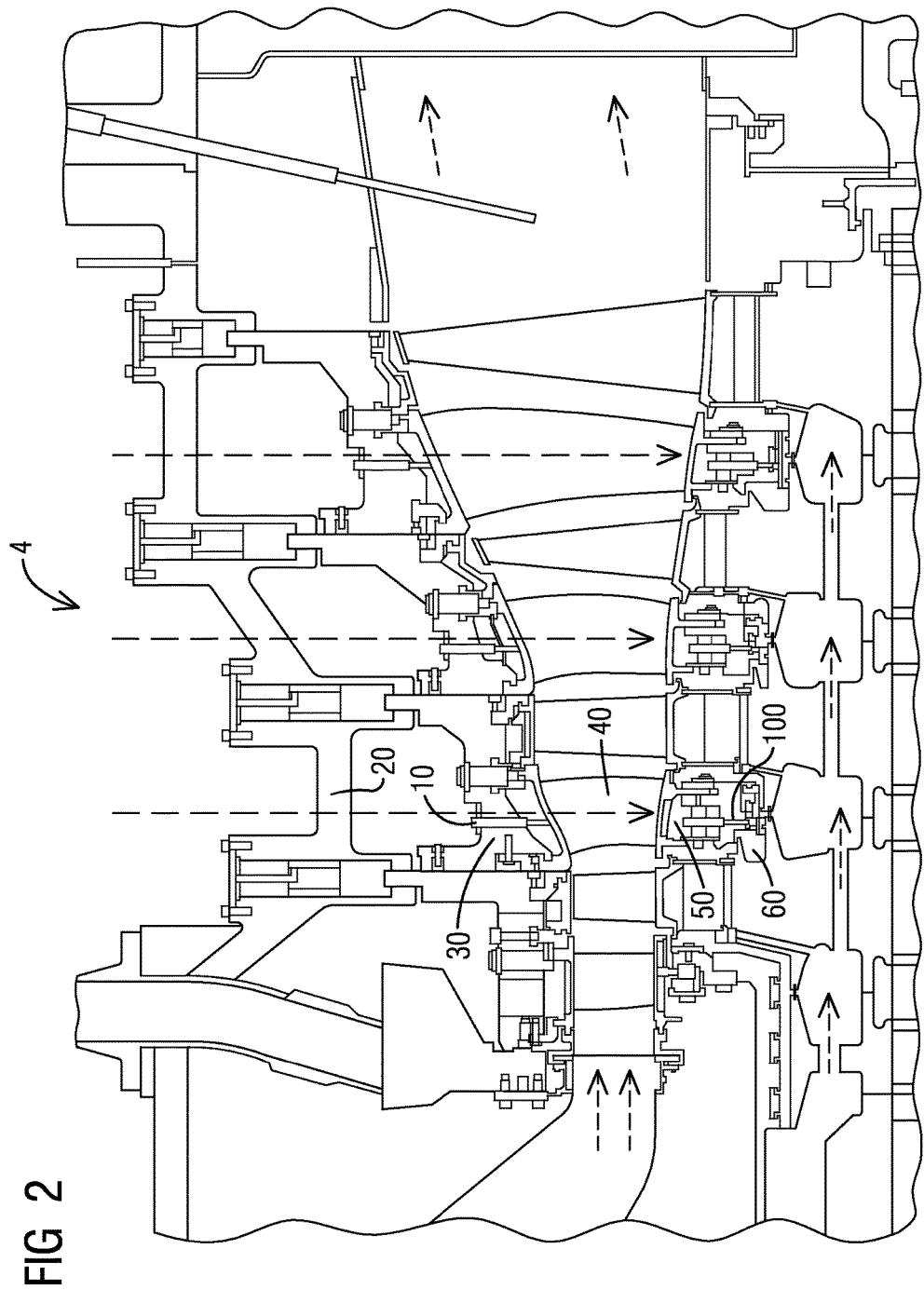
FIG. 2 . . . illustrates a longitudinal view of a turbine section of a gas turbine engine, FIG. 3 . . . illustrates a portion of the turbine section of a gas turbine engine, and FIG. 4 . . . illustrates a longitudinal view of a thermocouple, and FIG. 5 . . . illustrates a longitudinal view of a thermocouple within a guide tube.

FIG. 2 illustrates a longitudinal view of the turbine section (4) of a gas turbine (1). In the shown embodiment, four stages of blades and vanes are shown. The dimensions of the components of each stage including the vanes and blades increase in a fluid flow direction. As mentioned previously, for each stage two thermocouples may be inserted through guide tubes into the turbine section (4). Each thermocouple (10) is inserted in a direction as shown by the down facing arrows in FIG. 2, from the exterior of the turbine outer casing (20) radially inwards and into the rotor disc cavity (60) through guide tubes within radially extending bores within the intervening components. For example, as illustrated in FIG. 2, the thermocouple (10) passes through turbine components (going from a radially outward position inwards toward the rotor) such as the turbine outer casing (20), the turbine blade ring (30), a vane (40), and the interstage seal housing (50).

Figure 3:
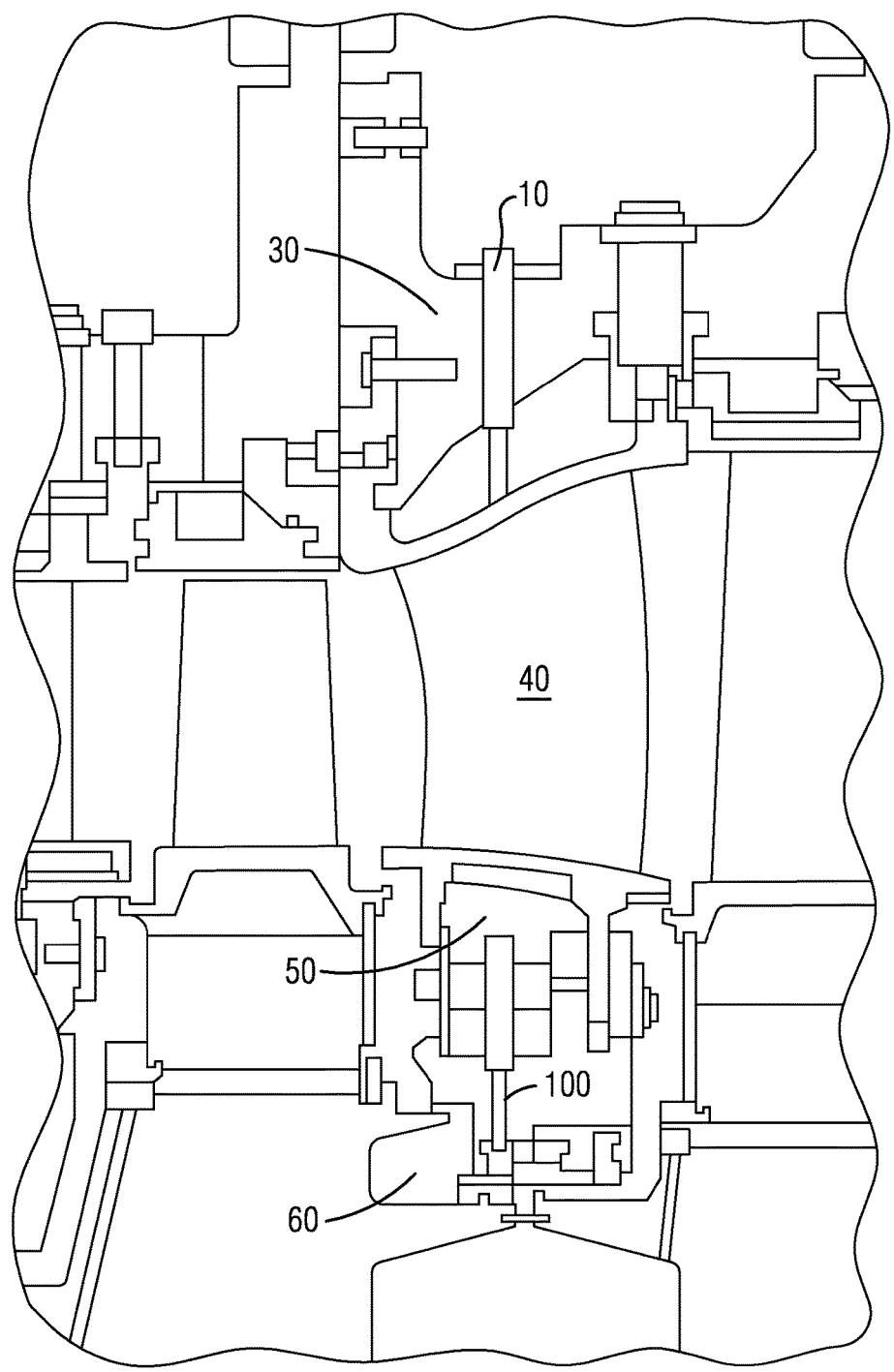

FIG. 3 shows a zoomed in portion of FIG. 2 illustrating the vane (40) and the interstage seal housing (50) through which the thermocouple (10) extends. A tip portion of the thermocouple (10) which includes a temperature sensing element (100) extends into the rotor disc cavity (60). The temperature sensing element (100) detects the temperature of the rotor disc cavity (60) which may be used as an indicator of the inner operation of the gas turbine engine (1).

FIG. 4 illustrates a thermocouple (10) including a plurality of antichafing strips (230). The thermocouple (10) includes a head portion (200), an elongated portion (210), and a tip portion (220). The tip portion (220) of the thermocouple (10) includes a temperature sensing element (100). Along the length of the elongated portion (210), a plurality of antichafing strips (230) is spaced at different intervals. The length of the thermocouple (10) depends on certain dimensions of the specific gas turbine engine and the stage in which the individual thermocouple (10) is disposed. Consequently, the spacing of the antichafing strips (230) along the elongated portion (210) also depend on the specific dimensions of the turbine components within the turbine section (4) of the gas turbine engine (1) as well as which stage the individual thermocouple (10) is disposed.

When inserted into the gas turbine engine (1) the tip portion (220) is threaded through radially extending guides tubes (70) disposed in bores within turbine components until the tip portion (220) extends radially inward into the rotor disc cavity (60). The elongated portion (210) is disposed at least partially within the guide tubes (70). The head portion (200) lies radially outward of the turbine outer casing (20) exterior to the gas turbine engine (1).

FIG. 5 illustrates a thermocouple (10) within a guide tube (70). As illustrated, the antichafing strips (230) maintain contact with the guide tubes (70) such that the tubular elongated portion (210) does not contact the guide tube (70). The antichafing strips (230) also assist in centering the elongated portion (210) within each guide tube (70).

The antichafing strips (230) each include a hole through which the elongated portion (210) extends. Each antichafing strip (230) may be attached to the elongated portion (210) by welding, however, other methods of attachment may also be possible. The material of the antichafing strips (230) may all be the same. The shape of antichafing strips (230) include spherical and/or cylindrical, however, other shapes may be possible such that the antichafing strip (230) maintains contact with the guide tube (70) during turbine operation.

During operation of the gas turbine engine (1), the turbine section (4) is quite susceptible to vibrations. These vibrations may cause the antichafing strips (230) to rub or chafe against the guide tube (70). Eventually the chafing may result in the antichafing strip (230) no longer being able to maintain contact with the guide tube (70). However, this would most likely occur at a time past when a gas turbine engine (1) would be shutdown for routine maintenance. During this routine maintenance, the thermocouple (10) and/or the antichafing strips (230) may be replaced.

Referring to the FIGS. 1-5, a method to prevent premature gas turbine engine (1) shutdown due thermocouple failure within the rotor disc cavity (6) is also provided. A thermocouple (10) is provided that includes a head portion (200), an elongated portion (210), and a tip portion (220) including a temperature sensing element (100). A plurality of antichafing strips (230) is disposed along the length of the elongated portion (210) of the thermocouple (10). The tip portion (220) is threaded through the guide tube (70) disposed within a radially extending bore within the interstage seal housing (50) between two adjacent rotor discs such that the tip portion (220) including the temperature sensing element (100) extends radially inward into the rotor disc cavity (60).

In the illustrated embodiment of FIG. 5, the thermocouple (10) is disposed within a plurality of guide tubes (70) such that the antichafing strips (230) maintain contact with the guide tube (70) while the gas turbine engine (10) is operating. The plurality of antichafing strips (230) deteriorate due to friction with the guide tubes (70) during normal operation of the gas turbine engine (1). The friction is created when the antichafing strips (230) rub or chafe against the guide tube (70) caused by repeated vibrations within the turbine section (4) of the gas turbine engine (1). However, typically this deterioration occurs slowly and the antichafing strip (230) will continue to maintain contact with the guide tube (70) until at least the gas turbine engine is shutdown for routine maintenance. At this time, the antichafing strips (230) on the thermocouples (10) or the thermocouples (10) including antichafing strips (230) may be replaced.

Each antichafing strip includes a hole through which the elongated portion extends. The plurality of antichafing strips (230) may be attached to the elongated portion (210) of the antichafing strips (230) by welding. The spacing between adjacent antichafing strips (230) along the length of the elongated portion (210) is determined based on the specific dimensions of the components within the turbine section of the gas turbine engine (1).

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. An arrangement to prevent thermocouple chafing with a guide tube within a rotor disc cavity during gas turbine engine operation, comprising:
   an interstage seal housing;
   a guide tube;
   a thermocouple including a tip portion, an elongated portion, a head portion, and an antichafing strip,
   wherein the guide tube is disposed in a radially extending bore of the interstage seal housing,
   wherein the tip portion extends radially inward into the rotor disc cavity, the elongated portion is disposed at least partially within the guide tube, and the head portion is disposed radially outward of a turbine outer casing,
   wherein the tip portion includes a temperature sensing element which measures the temperature of the rotor disc cavity,
   wherein the antichafing strip is disposed in a position along the length of the elongated portion such that the antichafing strip is at least partially disposed within the guide tube, wherein the antichafing strip maintains contact with the inner surface of the guide tube such that the thermocouple does not contact the guide tube and takes the wear or chafing against the inner surface instead of the thermocouple.

2. The arrangement as claimed in claim 1, wherein the arrangement comprises a plurality of guide tubes, each guide tube including a plurality of antichafing strips, and
wherein each antichafing strip is positioned within a guide tube.

3. The arrangement as claimed in claim 2, wherein a spacing between adjacent antichafing strips along the length of the elongated portion is determined based on specific gas turbine design criteria.

4. The arrangement as claimed in claim 2, wherein the material of each antichafing strip is the same.

5. The arrangement as claimed in claim 1, wherein the antichafing strip includes a hole through which the elongated portion is disposed and is positioned within the guide tube.

6. The arrangement as claimed in claim 5, wherein the interior portion of the hole within each antichafing strip is welded to the elongated portion of the thermocouple.

7. The arrangement as claimed in claim 1, wherein the shape of the antichafing strip is spherical.

8. The arrangement as claimed in claim 1, wherein the shape of the antichafing strip is cylindrical.

9. A method to prevent premature gas turbine engine shutdown due to thermocouple failure within a rotor disc cavity comprising:
providing a thermocouple including a tip portion, an elongated portion and a head portion wherein the tip portion includes a temperature sensing element;
disposing a plurality of antichafing strips along the length of the elongated portion; and threading the tip portion through a guide tube disposed within a radially extending bore in an interstage seal housing between two adjacent rotor discs until the tip portion with the temperature sensing element extends radially inward into a rotor disc cavity such that the antichafing strips prevent the thermocouple from contacting the guide tube,
wherein the plurality of antichafing strips deteriorate due to the friction with the guide tube during normal operation of the gas turbine engine within the turbine section of the gas turbine engine, wherein when the antichafing strips no longer maintain contact with the guide tube due to the deterioration, the antichafing strips are replaced during a routine gas turbine engine shutdown.

10. The method as claimed in claim 9, wherein each antichafing strip includes a hole through which the elongated portion extends.

11. The method as claimed in claim 10, wherein the method includes welding an interior portion of the hole of each of the antichafing strips to the elongated portion, and
wherein the plurality of antichafing strips are spaced along a length of the elongated portion.

12. The method as claimed in claim 9, wherein a plurality of guide tubes are disposed within components in a turbine section of the gas turbine engine.

13. The method as claimed in claim 12, wherein each antichafing strip maintains contact with a corresponding guide tube while the gas turbine engine is operating.

14. The method as claimed in claim 9, comprising determining the spacing between adjacent antichafing strips based on specific dimensions of the gas turbine engine.

15. The method as claimed in claim 9, comprising replacing the thermocouples including the antichafing strips during a routine gas turbine engine shutdown.

* * * * *